(12) United States Patent
Shedletsky et al.

(10) Patent No.: US 9,282,653 B2
(45) Date of Patent: Mar. 8, 2016

(54) ENHANCED GLASS IMPACT DURABILITY THROUGH APPLICATION OF THIN FILMS

(71) Applicant: Apple Inc., Cupertino, CA (US)

(72) Inventors: Anna-Katrina Shedletsky, Sunnyvale, CA (US); Christopher D. Prest, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 14/256,945

(22) Filed: Apr. 19, 2014

(65) Prior Publication Data

US 2014/0226269 A1 Aug. 14, 2014

Related U.S. Application Data

(62) Division of application No. 13/168,816, filed on Jun. 24, 2011, now Pat. No. 8,715,779.

(51) Int. Cl.
*B32B 3/00* (2006.01)
*H05K 5/00* (2006.01)
*C03C 17/34* (2006.01)

(52) U.S. Cl.
CPC .......... *H05K 5/0017* (2013.01); *C03C 17/3441* (2013.01); *Y10T 29/49982* (2015.01); *Y10T 428/24777* (2015.01); *Y10T 428/24802* (2015.01)

(58) Field of Classification Search
None
See application file for complete search history.

(56) References Cited

U.S. PATENT DOCUMENTS

| | | |
|---|---|---|
| 5,122,403 A | 6/1992 | Roginski et al. |
| 5,399,200 A | 3/1995 | Stauffer |
| 5,637,353 A | 6/1997 | Kimock et al. |
| 5,800,918 A | 9/1998 | Chartier et al. |
| 6,383,642 B1 | 5/2002 | Le Bellac et al. |
| 6,660,389 B2 | 12/2003 | Liu et al. |
| 6,815,070 B1 | 11/2004 | Burkle |
| 6,893,939 B1 | 5/2005 | Grace et al. |
| 7,101,616 B2 | 9/2006 | Arney et al. |
| 7,335,786 B1 | 2/2008 | Iyer et al. |
| 8,044,942 B1 | 10/2011 | Leohard et al. |
| 8,715,779 B2 | 5/2014 | Shedletskey et al. |

(Continued)

FOREIGN PATENT DOCUMENTS

| | | |
|---|---|---|
| CN | 1522312 A | 8/2004 |
| CN | 101337220 A | 1/2009 |

(Continued)

OTHER PUBLICATIONS

Bourlinos et al., "Easy Deposition of Amorphous Carbon Films on Glass Substrates", Carbon 46, 2008, pp. 1792-1828.

(Continued)

*Primary Examiner* — David Sample
*Assistant Examiner* — Christopher Polley

(57) ABSTRACT

Apparatus, systems and methods for characteristics of glass components through use of one or more coatings are disclosed. The coatings are typically thin coatings, such as thin film coatings. The coatings can serve to increase strength of the glass components and/or provide durable user interfacing surfaces. Accordingly, glass articles that have received coatings are able to be not only thin but also sufficiently strong so as to resist damage from impact events. The coated glass articles are well suited for use in consumer products, such as consumer electronic devices (e.g., electronic devices).

25 Claims, 10 Drawing Sheets

(56) References Cited

U.S. PATENT DOCUMENTS

| | | |
|---|---|---|
| 2002/0192472 A1 | 12/2002 | Metz |
| 2002/0196401 A1 | 12/2002 | Grace et al. |
| 2003/0012936 A1 | 1/2003 | Draheim et al. |
| 2003/0101937 A1 | 6/2003 | Van Slyke et al. |
| 2003/0129355 A1 | 7/2003 | Ross |
| 2003/0168013 A1 | 9/2003 | Freeman et al. |
| 2004/0020761 A1 | 2/2004 | Thomsen et al. |
| 2004/0109096 A1 | 6/2004 | Anderson et al. |
| 2004/0144321 A1 | 7/2004 | Grace et al. |
| 2004/0157044 A1 | 8/2004 | Kang et al. |
| 2004/0223750 A1 | 11/2004 | Endo et al. |
| 2004/0227722 A1 | 11/2004 | Friberg et al. |
| 2005/0016461 A1 | 1/2005 | Klug et al. |
| 2005/0037184 A1 | 2/2005 | Halsey |
| 2005/0066893 A1 | 3/2005 | Soininen |
| 2005/0129860 A1 | 6/2005 | Echigo et al. |
| 2005/0191494 A1* | 9/2005 | Veerasamy ....... B32B 17/10174 428/408 |
| 2005/0285823 A1 | 12/2005 | Kimura et al. |
| 2005/0287449 A1 | 12/2005 | Matthys et al. |
| 2006/0029813 A1 | 2/2006 | Kutilek |
| 2006/0040105 A1 | 2/2006 | Sato et al. |
| 2006/0144338 A1 | 7/2006 | Liu et al. |
| 2006/0150915 A1 | 7/2006 | Freeman et al. |
| 2006/0166009 A1* | 7/2006 | Veerasamy ............ B05D 5/083 428/433 |
| 2007/0059490 A1 | 3/2007 | Kaneko |
| 2007/0060465 A1 | 3/2007 | Varshneya |
| 2007/0158654 A1 | 7/2007 | Kholodenko et al. |
| 2008/0049326 A1 | 2/2008 | Hanson |
| 2008/0050600 A1 | 2/2008 | Fan et al. |
| 2008/0174853 A1 | 7/2008 | Danner et al. |
| 2008/0265387 A1 | 10/2008 | D'Urso et al. |
| 2009/0011127 A1 | 1/2009 | Kuper |
| 2009/0011602 A1* | 1/2009 | Nozawa ................. C23C 16/26 438/694 |
| 2009/0029264 A1 | 1/2009 | Nakazawa et al. |
| 2009/0047415 A1 | 2/2009 | Jiang et al. |
| 2009/0098280 A1 | 4/2009 | Tahon |
| 2009/0197048 A1 | 8/2009 | Amin et al. |
| 2009/0263593 A1 | 10/2009 | Hamaguchi et al. |
| 2009/0297703 A1 | 12/2009 | Li et al. |
| 2010/0026646 A1 | 2/2010 | Xiao et al. |
| 2010/0089615 A1* | 4/2010 | Kuchiyama ......... C03C 17/3441 174/126.4 |
| 2010/0285275 A1 | 11/2010 | Baca et al. |
| 2010/0302193 A1 | 12/2010 | Park |
| 2011/0067447 A1 | 3/2011 | Zadesky |
| 2011/0109594 A1 | 5/2011 | Marcus |
| 2012/0177358 A1 | 7/2012 | Wittenberg et al. |
| 2012/0327568 A1 | 12/2012 | Shedletsky et al. |
| 2014/0226269 A1 | 8/2014 | Shedletsky et al. |

FOREIGN PATENT DOCUMENTS

| | | |
|---|---|---|
| EP | 1555249 A1 | 7/2005 |
| EP | 2440956 A1 | 4/2012 |
| EP | 1493837 | 1/2015 |
| JP | 58 069743 | 4/1983 |
| JP | 61 051101 | 3/1986 |
| JP | 07157868 A | 6/1995 |
| JP | 2000164356 A | 6/2000 |
| JP | 2002249868 A | 9/2002 |
| JP | 2007119917 A | 5/2007 |
| JP | A 2010-532426 | 10/2010 |
| KR | 10-0597923 | 7/2006 |
| KR | 858914 B1 | 9/2008 |
| WO | WO03085157 | 10/2003 |
| WO | WO2010017503 | 5/2010 |

OTHER PUBLICATIONS

Veerasamy et al., "Diamond-like Amorphous Carbon Coatings for Large Areas of Glass", Thin Sold Films 442, 2003, 1-10.

Office Action for U.S. Appl. No. 13/168,816, mailed Mar. 1, 2013.

Office Action for U.S. Appl. No. 13/168,816, mailed Apr. 30, 2013.

Final Office Action for U.S. Appl. No. 13/168,816, mailed Oct. 10, 2013.

Notice of Allowance for U.S. Appl. No. 13/168,816, mailed Jan. 30, 2014.

* cited by examiner

ENHANCED GLASS IMPACT DURABILITY THROUGH APPLICATION OF THIN FILMS

CROSS-REFERENCE TO RELATED APPLICATION

This application is a divisional of U.S. patent application Ser. No. 13/168,816, filed Jun. 24, 2011 and entitled "ENHANCED GLASS IMPACT DURABILITY THROUGH APPLICATION OF THIN FILMS," which is hereby incorporated herein by reference.

BACKGROUND OF THE INVENTION

Conventionally, some portable electronic devices use glass as a part of their devices, either internal or external. Externally, a glass part can be provided as part of a housing or display, such a glass part can be referred to as a cover glass. The transparent and scratch-resistance characteristics of glass make it well suited for such applications. Internally, glass parts can be provided to support display technology. More particularly, for supporting an electronic display, a portable electronic device can provide a display technology layer beneath an outer cover glass. A sensing arrangement can also be provided with or adjacent the display technology layer. By way of example, the display technology layer may include or pertain to a Liquid Crystal Display (LCD) that includes a Liquid Crystal Module (LCM). The LCM generally includes an upper glass sheet and a lower glass sheet that sandwich a liquid crystal layer therebetween. The sensing arrangement may be a touch sensing arrangement such as those used to create a touch screen. For example, a capacitive sensing touch screen can include substantially transparent sensing points or nodes dispersed about a sheet of glass.

Unfortunately, however, continuing efforts to make portable electronic devices lighter and thinner. Generally speaking, the thinner glass is the more susceptible the glass is to damage when the portable electronic device is stressed or placed under a significant force. Chemical strengthening has been used to strengthen glass. While chemical strengthening is effective, there is a continuing need to provide improved ways to reduce susceptibility of glass to damage when used with portable electronic devices.

SUMMARY

The invention relates generally to techniques for improving characteristics of glass components through use of one or more coatings. The coatings are typically thin coatings, such as thin film coatings. The coatings can serve to increase strength of the glass components and/or provide durable user interfacing surfaces. Accordingly, glass articles that have received coatings are able to be not only thin but also sufficiently strong so as to resist damage from impact events better than uncoated glass. The coated glass articles are well suited for use in consumer products, such as consumer electronic devices (e.g., electronic devices).

Embodiments of the invention can pertain to improved housings for electronic devices that include a glass component that has been protected and/or strengthened through application of one or more coatings to the glass component. In one embodiment, the coatings can be thin film coatings. The use of multiple distinct coatings can provide improved characteristics of the glass component. The distinct coatings can be provided over separate portions or over one another (i.e., layered).

According to one embodiment, a first coating can strengthen a glass member for an electronic device housing. A second coating can provide a protective coating over at least a portion of the first coating. In one implementation, the first coating can be an atomic level coating (e.g., atomic layer deposition), and the second coating can provide a durable, hard surface that is substantially scratch resistant.

According to another embodiment, an electronic device housing can be provided with a glass article (or glass component) that has an atomic level coating that improves strength of the glass article. In one embodiment, a hard protective coating can be provided over at least a portion of the atomic level coating of the glass article to provide a durable surface. The coatings can be applied to selected portions of the glass article if desired.

According to another embodiment, a coating can strengthen a glass member for an electronic device housing. In one implementation, the first coating can be an amorphous carbon coating that serves to strengthen a glass member for an electronic device housing and/or provide a durable surface. The amorphous carbon coating is normally not applied over portions of the glass article that are to remain (such as a touch screen or visual display area). An additional coating can be provided over at least a portion of the amorphous carbon coating and/or over the glass member where there is no amorphous carbon coating.

According to another embodiment, an electronic device housing can be provided with a glass article that has a hard protective coating that improves durability and strength of the glass article. In one embodiment, the hard protective coating is a coating of amorphous carbon coating applied to selected portions of the glass article.

According to another embodiment, an electronic device housing can be provided with a glass article that uses a combination of coatings to achieve the desired characteristics. In one embodiment, the combination of coatings includes at least one soft coating and at least one hard coating. The soft coating facilitates impact protection, while the hard coating facilitates durability and strength. The coatings can be applied to selected portions of the glass article if desired.

The invention can be implemented in numerous ways, including as a method, system, device, or apparatus. Several embodiments of the invention are discussed below.

As an electronic device, one embodiment can, for example, include at least a housing that includes a glass member providing a user facing outer surface for a portion of the housing. At least a portion of the glass member can be provided over a display device that is provided within the housing. At least a portion of the glass member is provided with an amorphous carbon coating. The portion of the glass member that is provided with the amorphous carbon coating does not include the portion of the glass member provided over the display device provided within the housing.

As a method for processing a glass article for used with or as an electronic device housing, one embodiment can, for example, include at least the operations of: obtaining a glass article, depositing a coating of amorphous carbon on a least a portion of a surface of the glass article, and installing the glass article to or with the electronic device housing.

As another method for processing a glass article for used with or as an electronic device housing, one embodiment can, for example, include at least the operations of: obtaining a glass article, depositing a thin coating of amorphous carbon on a least a portion of a surface of the glass article, applying an outer thin coating over at least a portion of the thin coating of amorphous carbon, and installing the glass article to or with the electronic device housing.

As another method for processing a glass article for used with or as an electronic device housing, another embodiment can, for example, include at least the operations of: obtaining a glass article, applying a soft inner coating on a least a portion of a surface of the glass article, and applying a hard outer coating on a least a portion of the surface of the glass article or the soft inner coating of the glass article.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Figure 1:
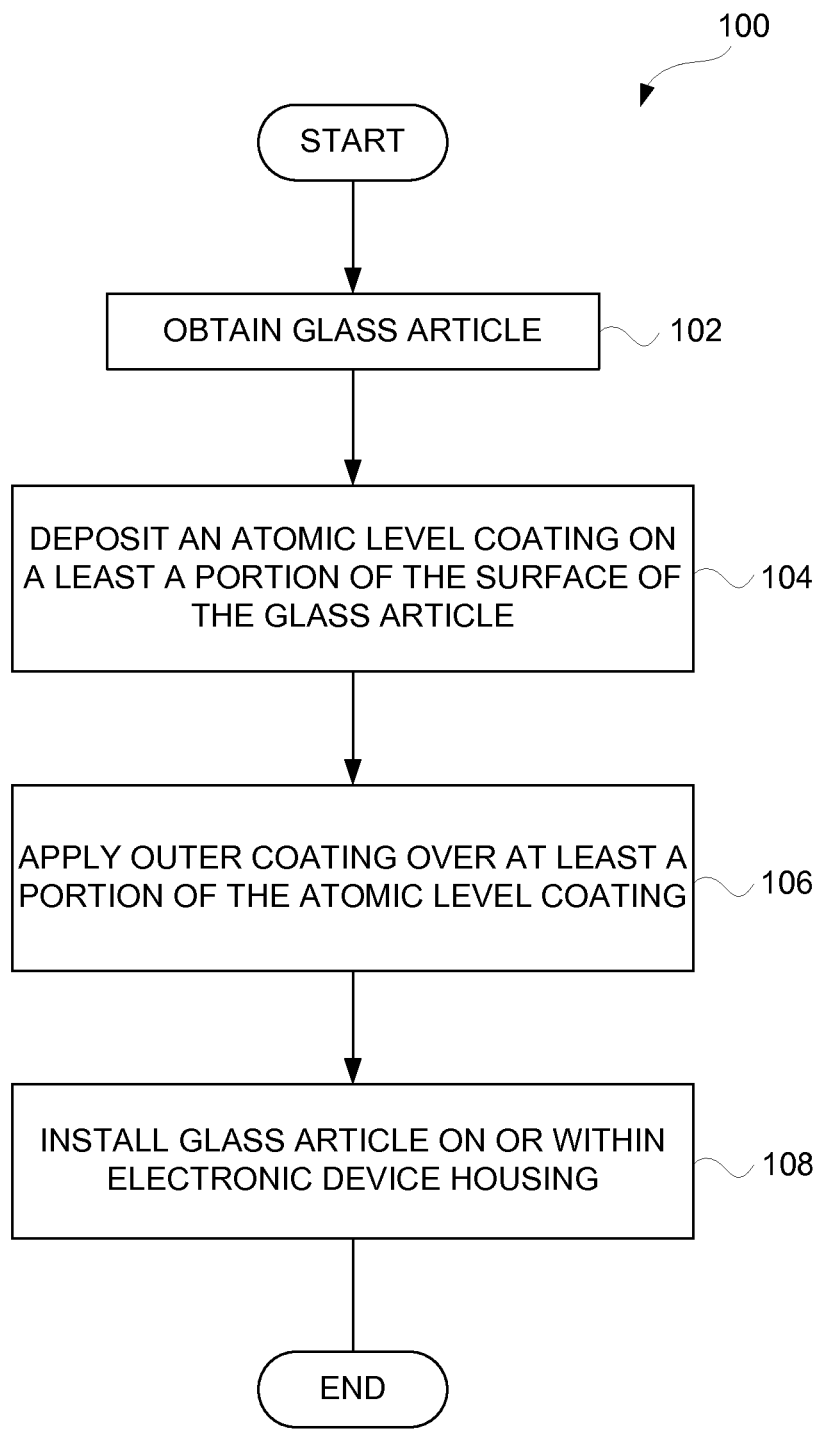
FIG. 1 is a flow diagram of a housing assembly process according to one embodiment.

Electronic devices, including portable electronic devices, can include housings that include glass components. For example, some portable electronic devices use outer glass covers, such as for a front surface of the housings. Often, outer glass covers are translucent and provided over an electronic display (e.g., LCD display). However, glass components can break under impact forces. Hence, there is a continuing need to improve the durability and/or strength of glass components to further improve their ability to avoid breakage when subjected to impact forces.

The invention relates generally to techniques for improving characteristics of glass components through application on one or more coatings. The coatings are typically thin coating, such as thin film coatings. The coatings can serve to increase strength of the glass components and/or durability of user interfacing surfaces. The glass components are suitable for use with electronic devices.

Embodiments of the invention can relate to apparatus, systems and methods for improving durability and/or strength of a thin glass member for a consumer product, such as a consumer electronic device. In one embodiment, the glass member may be an outer surface of a consumer electronic device. For example, the glass member may, for example, correspond to a glass cover that helps form part of a display area of the electronic device (i.e., situated in front of a display either as a separate part or integrated within the display). As another example, the glass member may form a part of a housing for the consumer electronic device (e.g., may form an outer surface other than in the display area). In another embodiment, the glass member may be an inner component of a consumer electronic device. For example, the glass member can be a component glass piece of a LCD display provided internal to the housing of the consumer electronic device.

The apparatus, systems and methods for improving durability and/or strength of thin glass are especially suitable for glass covers or displays (e.g., LCD displays), particularly those assembled in small form factor electronic devices such as handheld electronic devices (e.g., mobile phones, media players, personal digital assistants, remote controls, etc.). The glass can be thin in these small form factor embodiments, such as having a thickness of less than 3 mm, or more particularly between 0.2 and 1.5 mm. The apparatus, systems and methods can also be used for glass covers or displays for other devices including, but not limited to including, relatively larger form factor electronic devices (e.g., portable computers, tablet computers, displays, monitors, televisions, etc.). The glass can also be thin in these larger form factor embodiments, such as less than 5 mm, or more particularly between 0.3 and 3 mm.

Embodiments of the invention are discussed below with reference to FIGS. 1-10B. However, those skilled in the art will readily appreciate that the detailed description given herein with respect to these figures is for explanatory purposes as the invention extends beyond these limited embodiments. The illustrations provided in these figures are not necessarily drawn to scale; instead, the illustrations are presented in a manner to facilitate presentation.

According to one aspect, an electronic device housing can be provided with a glass article (or glass component) that has an atomic level coating that improves strength of the glass article. In one embodiment, a hard protective coating can be provided over at least a portion of the atomic level coating of the glass article to provide a durable surface. The coatings can be applied to selected portions of the glass article if desired.

FIG. 1 is a flow diagram of a housing assembly process 100 according to one embodiment. The housing being assembled can pertain to a housing for an electronic device, such as a portable electronic device. The housing, as discussed below, can include one or more glass components that can serve as a portion of the housing.

The housing assembly process 100 can obtain 102 a glass article that is to be utilized as part of the housing for an electronic device. The glass article can serve as an outer surface for a portion of the housing. For example, the glass article can be referred to as a cover glass and serve as a front glass cover for the housing. The thickness and size of the glass article varies with application. In one embodiment, the glass article has a thickness less than or equal to 5 (five) mm. In another embodiment, the glass article has a thickness less than or equal to 3 (three) mm. In another embodiment, the glass article has a thickness less than or equal to 1 (one) mm. Also, it should be recognized that the glass article can be pre-processed to chemically strengthen the glass article.

After the glass article has been obtained 102, the glass article can be processed to improve its strength. In this regard, an atomic level coating can be deposited 104 on at least a portion of the surface of the glass article. The atomic level coating is transparent (or substantially transparent) and, thus, does not impede the ability to use the glass article as a cover glass for the housing. The atomic level coating is a very thin coating that can be applied to one or more surfaces of the glass article. The atomic level coating is deposited using atomic layer deposition. Atomic layer deposition is a thin film technology that is or is similar to a chemical vapor deposition (CVD) method except that precursors are separated such that deposition is atom-by-atom which is highly conformal. By providing the glass article with the atomic level coating, the resulting glass article is more durable and/or stronger in that it is more resistant to breakage due to impact forces, such as sharp, blunt or edge impacts. The atomic level coating can, for example, be formed of at least one of $Al_2O_3$, AlSiO, $TlO_2$ or $SiO_2$.

After the atomic level coating has been deposited 104, an outer coating can be applied 106 over at least a portion of the atomic level coating. While the atomic level coating can substantially improve the strength of the glass article, the atomic level coating may not be sufficiently scratch resistant for use as a user interfacing surface. Hence, the outer coating applied 106 over the atomic level coating can serve to provide a protective barrier that is substantially scratch resistant such that the processed glass article can be utilized as a user interfacing surface. The outer coating is also transparent (or substantially transparent) so that is does not impede the ability to use the glass article as a cover glass for the housing. In one embodiment, the outer coating can be formed of at least one of $SiO_2$ and SiN. In another embodiment, the outer coating can be an oleophobic coating. In general, the outer coating is thin and applied through deposition or spray techniques. In one embodiment, the outer coating has a thickness less than or equal to 0.1 mm.

Thereafter, the processed glass article with the atomic level coating and the outer coating can be installed 108 on or within the housing for the electronic device. As previously noted, the processed glass article is suitable for use as a user interfacing surface of the housing. For example, the processed glass article can be used as a cover glass for a front face of a portable electronic device housing. Although the processed glass article with its coatings is well suited for use as a user interfacing surface, the processed glass article need not be exposed to user interactions but instead can be provided internal to the housing. After the glass article has been installed 108, the housing assembly process 100 can end.

In an alternative embodiment, the outer coating may or may not be translucent. In such case, the coating may only be provided onto surfaces through which translucency is not needed, such as non-user interfacing surfaces. In one implementation, the outer coating could be an amorphous carbon coating. The amorphous carbon coating can be a coating of amorphous carbon with diamond like properties. A coating of amorphous carbon with diamond like properties refers to diamond-like coating which is hard and offers very good wear resistance.

FIGS. 2A-2D illustrate processing and assembly of a portion of an electronic device housing. In one embodiment, the processing and assembly depicted in FIGS. 2A-2D can perform the housing assembly process 100 illustrated in FIG. 1.

Figure 2A:
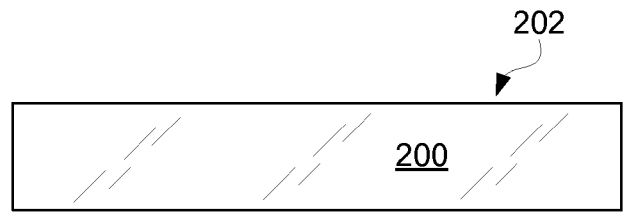
FIGS. 2A-2D illustrate processing and assembly of a portion of an electronic device housing.

FIG. 2A illustrates a glass article 200 according to one embodiment. The glass article 200 is typically a thin sheet of glass. Typically, the glass article 200 will have a thickness of less than 3 mm and in many cases less than 1 mm. The glass article 200 has an outer exposed surface 202 that can be referred to as a user interfacing surface. The outer exposed surface 202 is thus an exposed surface of the electronic device housing that a user can interface with to interact with the associated electronic device. For example, when the glass article 200 is utilized as a cover glass for an electronic device housing, the user can touch the outer exposed surface 202 while providing touch inputs to the associated electronic device, or the user can view (through the glass article 200) visual outputs from a display device of the associated electronic device mounted behind the glass article 200.

Figure 2B:
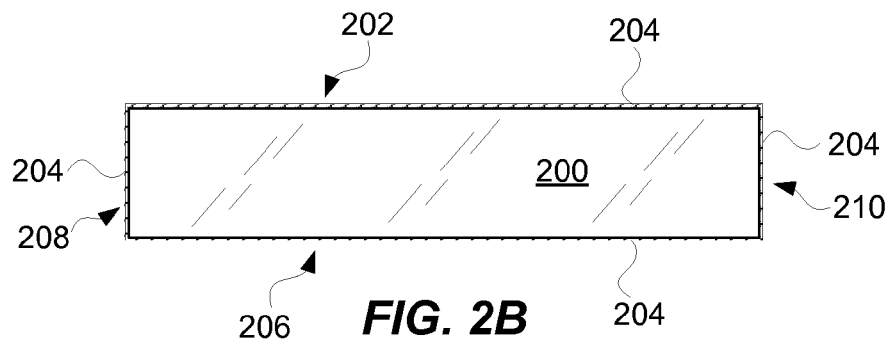

FIG. 2B illustrates the glass article 200 illustrated in FIG. 2A after an atomic level coating 204 has been applied. In the depicted embodiment, the atomic level coating 204 is provided on all sides of the glass article 200. More particularly, the glass article 200 includes not only the exposed outer surface 202 but also a bottom surface 206 and side surfaces 208, 210, and the atomic level coating 204 can be applied to the outer exposed surface 202, the bottom surface 206 and the side surfaces 208, 210. However, in other embodiments, the atomic level coating 204 can be applied to less than all of the surfaces of the glass article 200, such as to just the outer exposed surface 202 of the glass article 200.

Figure 2C:
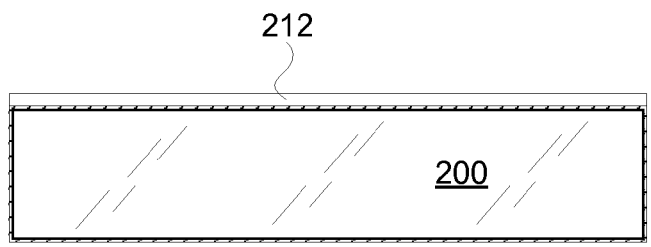

After in the atomic level coating 204 is been applied to one or more surfaces of the glass article 200, a protective coating 212 can be applied to at least the exposed outer surface 202 of the glass article 200. FIG. 2C illustrates the glass article 200 with the atomic level coating 204 as well as with the protective coating 212 applied over the exposed outer surface 202. The protective coating 212 provides a hard, scratch resistant surface for the exposed outer surface 202 of the glass article. It should be understood that the protective coating 212 could also be applied to the bottom surface 206 and/or one or both of the side surfaces 208, 210.

Figure 2D:
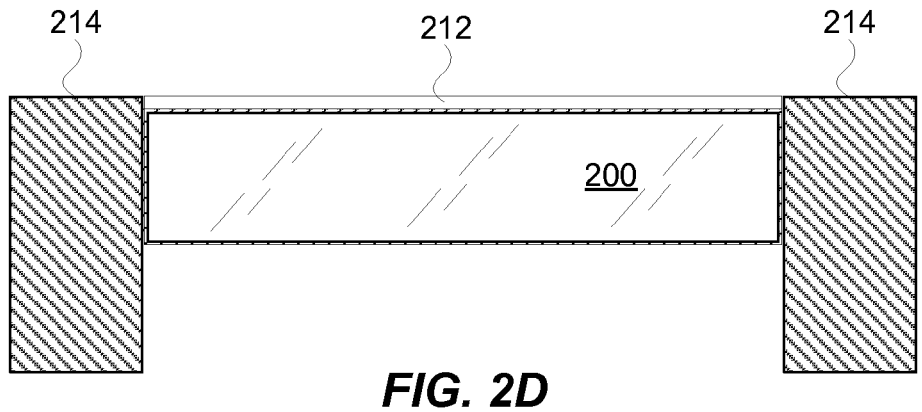

FIG. 2D illustrates the processed glass article 200 shown in FIG. 2C being assembled with the electronic device housing. Specifically, the electronic device housing includes one or more support structures 214 that forms part of the electronic device housing. As illustrated in FIG. 2D, the processed glass article 200 (including its atomic level coating 204 and protective coating 212) can be assembled to the electronic device housing such that the glass article 200 is positioned and secured to the electronic device housing proximate to the one or more support structures 214. In should be noted that the exposed outer surface 202 remains exposed even after assembly with the electronic device housing. The glass article 200 can, however, be provided essentially flush with other portions (e.g., surrounding portions) of the electronic device housing. The glass article 200 can also be recessed or can be extending outward (i.e., proud) with respect to the electronic display housing.

The materials utilized for the processed glass article can vary with implementation. In one implementation, the glass for the glass article 200 can, for example, be alumina silicate glass or soda lime glass. In one implementation, the atomic level coating 204 can, for example, be formed of at least one of $Al_2O_3$, AlSiO, $TiO_2$ and $SiO_2$. In one implementation, the protective coating can be formed of at least one of $SiO_2$ and SiN, or can be an oleophobic coating.

Figure 3A:
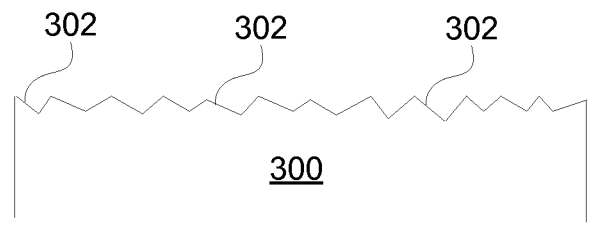
FIGS. 3A-3C illustrate processing of a surface of a glass article according to one embodiment.
Figure 3B:
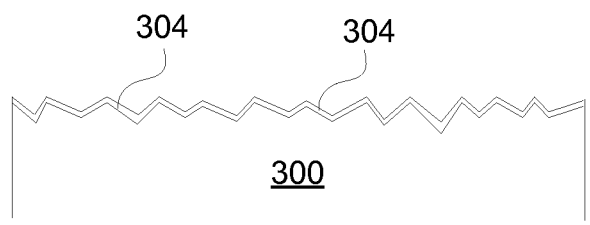
Figure 3C:
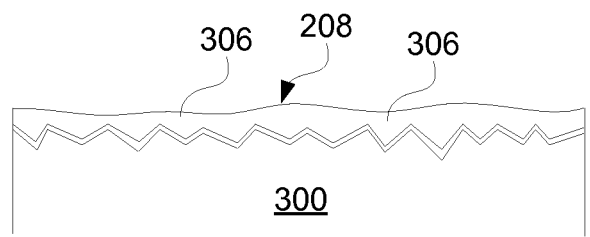

FIGS. 3A-3C illustrate processing of a surface of a glass article according to one embodiment. The glass article can, for example, represent the glass article illustrated in FIGS. 2A-2D or the glass article used with the housing assembly process 100 illustrated in FIG. 1. More specifically, FIGS. 3A-3C can provide magnified illustrations of a section of a surface of a glass article. The glass article may or many not have undergone polishing. The surface of the glass article can represent a user exposed surface of the glass article that forms an outer portion of an electronic device housing.

FIG. 3A illustrates a magnified view of a glass article 300 having micro-flaws 302 in an exposed surface. These micro-flaws 302 are very small and thus without magnification would not be visible to a human. Nevertheless, the micro-flaws 302 are micro-defects in the exposed surface can weaken the strength of the glass article 300. The micro-flaws 302 can be caused during forming or processing the glass. As an example, the micro-flaws 302 can be caused by polishing the glass article 300 which is often done after cutting operations. The micro-flaws 302 can also be referred to as "Griffith Flaws". The micro-flaws 302 can be due to cut edges (e.g., sides) or larger polished surfaces.

FIG. 3B illustrates a magnified view of the glass article 300 illustrated in FIG. 3A after an atomic level coating 304 has been applied. In the depicted embodiment, the atomic level coating 304 is provided on the exposed surface of the glass article 300. Since the atomic level coating 304 is very thin, it is able to at least partially fill into the micro-flaws 302 in the exposed surface. As a result, the micro-defects in the glass article 300 due to the micro-flaws 302 are rendered less susceptible to further cracking. Consequently, the exposed surface of the glass article 300, and thus the glass article 300 as a whole, can become stronger.

FIG. 3C illustrates a magnified view of the glass article 300 with the atomic level coating 304 illustrated in FIG. 3B after a protective coating 306 has been applied. The protective coating 306 is applied over the atomic level coating 304. The protective coating 306 provides a hard, scratch resistant surface for the exposed surface of the glass article. Typically, the exposed surface of the glass article 300 remains exposed even after assembly with an electronic device housing (sometimes even its edges remain exposed. Advantageously, the atomic level coating 304 is highly conformal and can operate to increase the radius of micro-flaws which can in turn reduce stress concentrations due to the micro-flaws.

Figure 4:
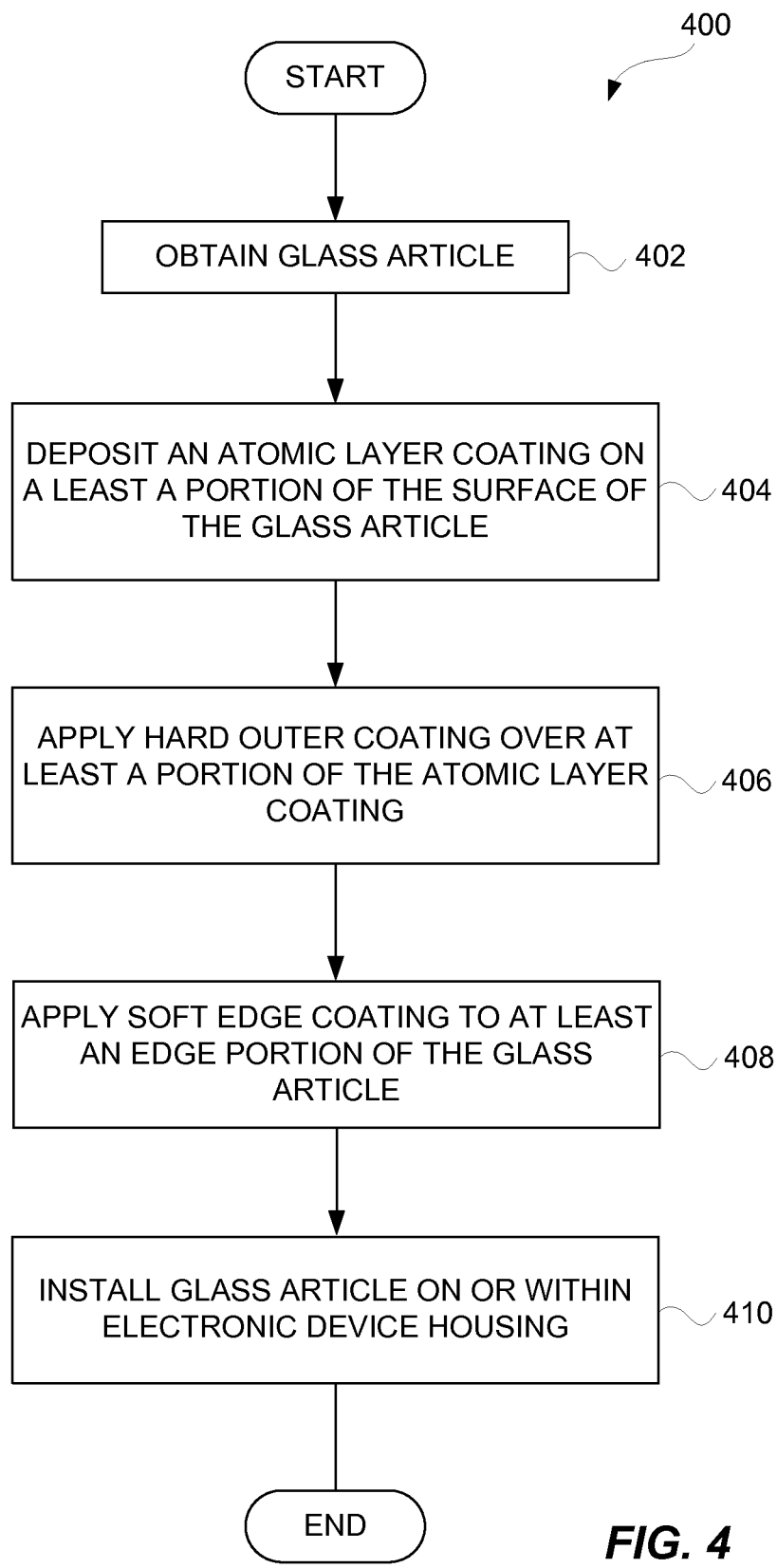
FIG. 4 is a flow diagram of a housing assembly process according to another embodiment.

FIG. 4 is a flow diagram of a housing assembly process 400 according to another embodiment. The housing being assembled can pertain to a housing for an electronic device, such as a portable electronic device. The housing can include one or more glass components that can serve as a portion of the housing.

The housing assembly process 400 can obtain 402 a glass article that is to be utilized as part of the housing for an electronic device. The glass article can serve as an outer surface for a portion of the housing. For example, the glass article can be referred to as a cover glass and serve as a front glass cover for the housing. The thickness and size of the glass article varies with application. In one embodiment, the glass article has a thickness less than or equal to 5 (five) mm. In another embodiment, the glass article has a thickness less than or equal to 3 (three) mm. In another embodiment, the glass article has a thickness less than or equal to 1 (one) mm. Also, it should be recognized that the glass article can be pre-processed to chemically strengthen the glass article.

After the glass article has been obtained 402, the glass article can be processed to improve its strength. In this regard, an atomic level coating can be deposited 404 on at least a portion of the surface of the glass article. The atomic level coating is transparent (or substantially transparent) and, thus, does not impede the ability to use the glass article as a cover glass for the housing. The atomic level coating is a very thin coating that can be applied to one or more surfaces of the glass article. The atomic level coating is deposited using atomic layer deposition. Atomic layer deposition is a thin film technology that is or is similar to a chemical vapor deposition (CVD) method. By providing the glass article with the atomic level coating, the resulting glass article is more durable and/or stronger in that it is more resistant to breakage due to impact forces, such as sharp, blunt or edge impacts. The atomic level coating can, for example, be formed of at least one of $Al_2O_3$ and AlSiO.

After the atomic level coating has been deposited 404, a hard outer coating can be applied 406 over at least a portion of the atomic level coating. While the atomic level coating can substantially improve the strength of the glass article, the atomic level coating may not be sufficiently scratch resistant for use as a user interfacing surface. Hence, the hard outer coating applied 406 over the atomic level coating can serve to provide a protective barrier that is substantially scratch resistant such that the processed glass article can be utilized as a user interfacing surface. The hard outer coating is also transparent (or substantially transparent) so that is does not impede the ability to use the glass article as a cover glass for the housing. In one embodiment, the hard outer coating can be formed of at least one of $SiO_2$ and SiN. In another embodiment, the hard outer coating can be an oleophobic coating. In general, the hard outer coating is thin and applied through deposition or spray techniques. In one embodiment, the outer coating has a thickness less than or equal to 0.1 mm.

The housing assembly process 400 can also apply 408 a soft edge coating to at least an edge portion of the glass article. The edge portion that receives the soft edge coating that is applied 408 to the glass article. The soft edge coating can be formed by a soft material, such as epoxy, silicone or various polymers, to the edge portion. In one embodiment, the thickness of the soft edge coating can be about 25-100 micrometers. The soft edge coating at the edge portion can serve to protect the edge portion from impact events, such as due to a user dropping the housing for the electronic device. The soft edge coating can be applied 408 to the edge portion by injection molding or other techniques.

Thereafter, the processed glass article with the atomic level coating and the hard outer coating and the soft edge coating can be installed 410 on or within the housing for the electronic device. As previously noted, the processed glass article is suitable for use as a user interfacing surface of the housing. For example, the processed glass article can be used as a cover glass for a front face of a portable electronic device housing. Although the processed glass article with its coatings is well suited for use as a user interfacing surface, the processed glass article need not be exposed to user interactions but instead can be provided internal to the housing. After the glass article has been installed 410, the housing assembly process 400 can end.

In an alternative embodiment, the outer coating may or may not be translucent. In such case, the coating may only be provided onto surfaces through which translucency is not needed, such as non-user interfacing surfaces (e.g., edges of glass article or non-active areas of display/touch screen). In one implementation, the outer coating could be an amorphous carbon coating. The amorphous carbon coating can be a coating of amorphous carbon with diamond like properties.

In another alternative embodiment, the hard outer coating can be deposited on at least a portion of the surface of the glass article. That is, the hard outer coating can, in general, be deposition directly onto the surface of the glass article without any intermediate layers in between or there can be one or more layers between the hard outer coating and the surface of the glass. Different portions of the glass article can have one or more different layers of coatings applied thereto.

According to another aspect, an electronic device housing can be provided with a glass article that has a hard protective coating that improves durability and strength of the glass article. In one embodiment, the hard protective coating is a coating of amorphous carbon coating applied to selected portions of the glass article.

Figure 5:
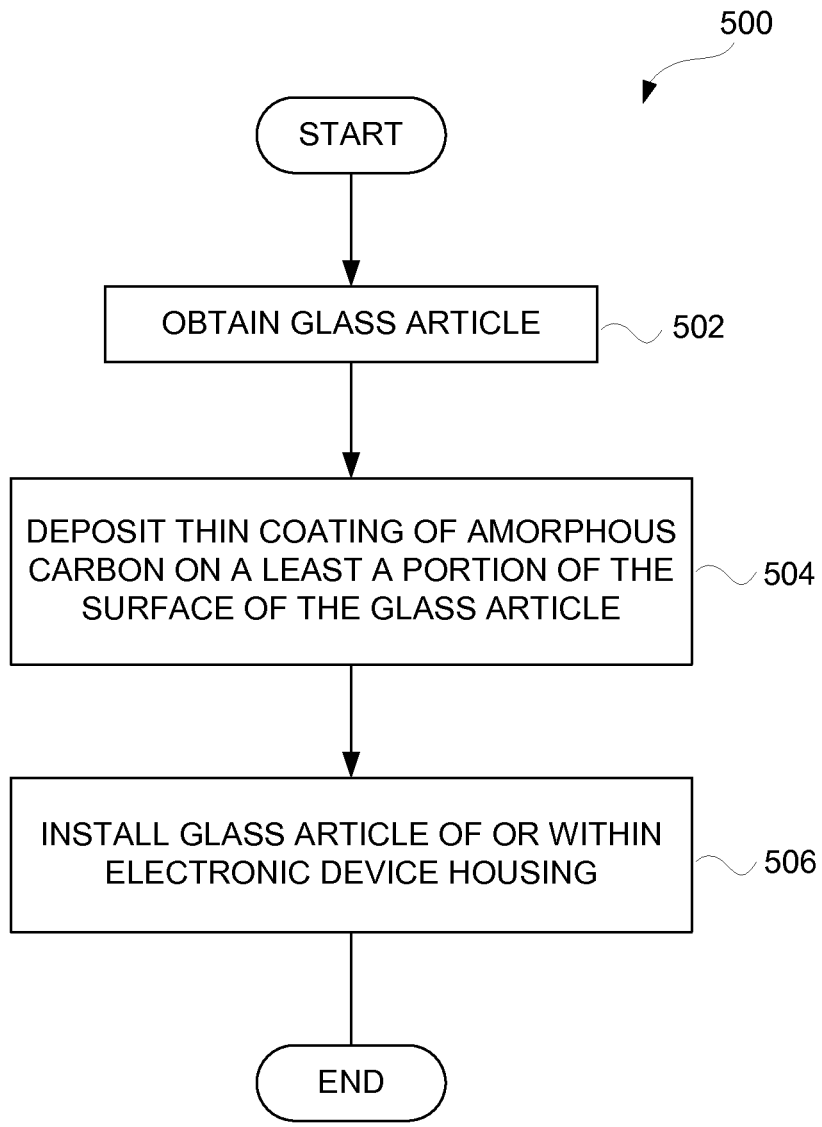
FIG. 5 is a flow diagram of a housing assembly process according to another embodiment.

FIG. 5 is a flow diagram of a housing assembly process 500 according to another embodiment. The housing being assembled can pertain to a housing for an electronic device, such as a portable electronic device. The housing, as discussed below, can include one or more glass components that can serve as a portion of the housing.

The housing assembly process 500 can obtain 502 a glass article that is to be utilized as part of the housing for an electronic device. The glass article can serve as an outer surface for a portion of the housing. For example, the glass article can be referred to as a cover glass and serve as a front glass cover for the housing. The thickness and size of the glass article varies with application. In one embodiment, the glass article has a thickness less than or equal to 5 (five) mm. In another embodiment, the glass article has a thickness less than or equal to 3 (three) mm. In another embodiment, the glass article has a thickness less than or equal to 1 (one) mm. Also, it should be recognized that the glass article can be pre-processed to chemically strengthen the glass article.

After the glass article has been obtained 502, the glass article can be processed to improve its strength. In this regard, an amorphous carbon coating can be deposited 504 on a portion of the surface of the glass article. The amorphous carbon coating is a thin coating (e.g., thin film) that can be applied to one or more surfaces of the glass article. The amorphous carbon is a hard coating that can be said to have diamond like properties. The amorphous carbon coating is not transparent (or substantially not transparent) and, thus, does impede the ability to use the glass article as a transparent cover glass for the housing. However, the amorphous carbon coating can be selectively deposited 504 to those portions of the surface of the glass article that are able to opaque. For example, a peripheral portion of the glass article might be coated with amorphous carbon, while a central portion might not be coated with amorphous carbon so that it remain transparent and thus suitable for use as a user interfacing surface. In one embodiment, the amorphous carbon coating can be deposited 504 using a plasma-assisted Physical Vapor Deposition (PVD) process. In one implementation, a masking operation can facilitate selectively depositing 504 of the amorphous carbon coating to certain portions of the glass article.

By providing the glass article with the amorphous carbon coating, the resulting glass article is more durable and/or harder. In areas where the glass article has the amorphous carbon coating, the resulting glass article is significantly more resistant to breakage due to impact forces, such as sharp, blunt or edge impacts since the coating is harder than glass alone.

After the amorphous carbon coating has been deposited 504, the processed glass article with the amorphous carbon coating can be installed 506 on or within the housing for the electronic device. As previously noted, with selectively depositing the amorphous carbon, the processed glass article can remain suitable for use as a user interfacing surface of the housing. For example, the processed glass article can be used as a cover glass for a front face of a portable electronic device housing. Typically, to preserve transparency and suitably for a user interfacing surface, the central portion of the cover glass would not include an amorphous carbon coating. In such an embodiment, the peripheral portion is strengthened by an amorphous carbon coating, but the central portion is not coated with amorphous carbon and thus remains transparent. Although the processed glass article with its coatings can be well suited for use as a user interfacing surface, the processed glass article need not be exposed to user interactions but instead can be provided internal to the housing. After the glass article has been installed 506, the housing assembly process 500 can end.

Figure 6:
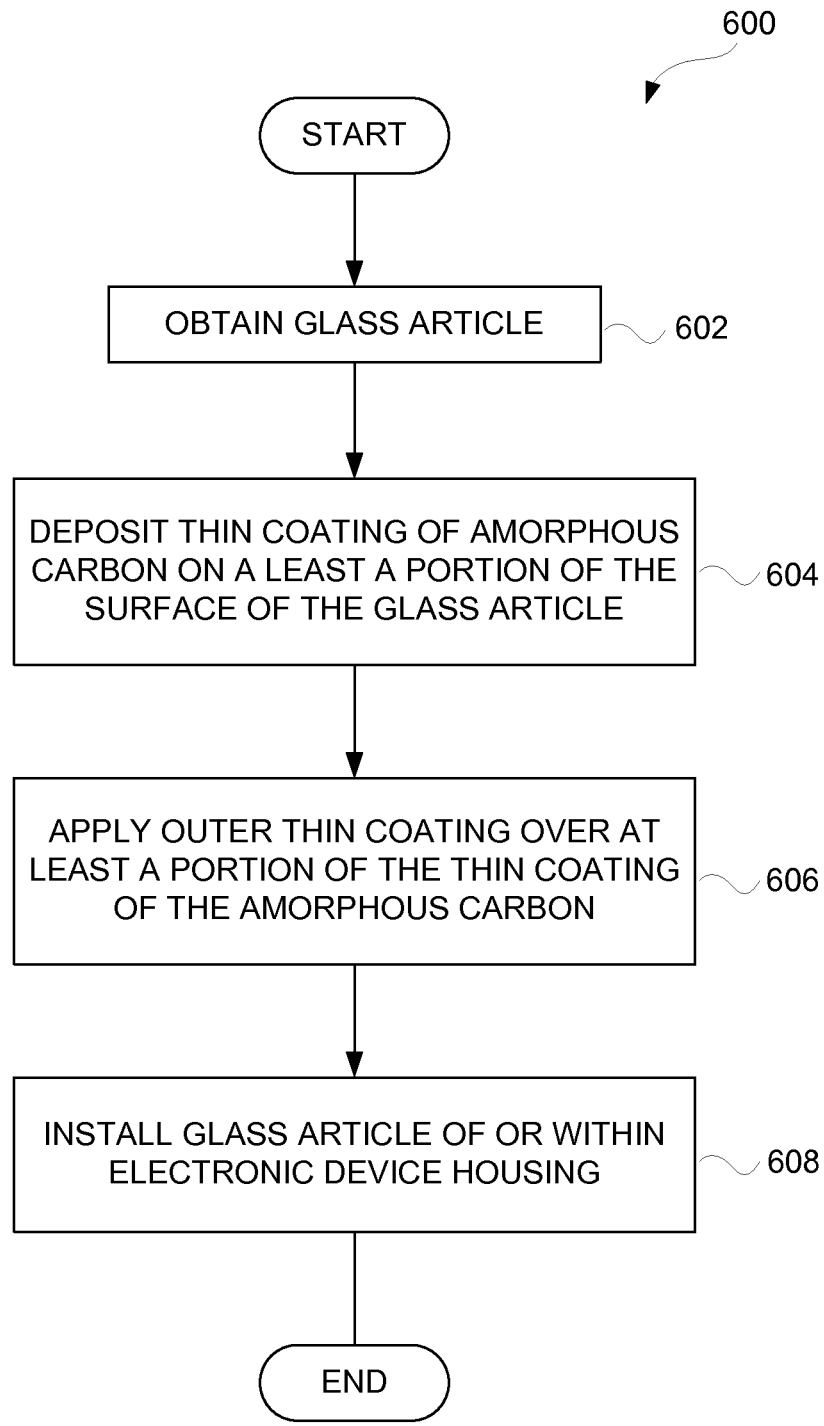
FIG. 6 is a flow diagram of a housing assembly process according to another embodiment.

FIG. 6 is a flow diagram of a housing assembly process 600 according to another embodiment. The housing being assembled can pertain to a housing for an electronic device, such as a portable electronic device. The housing, as discussed below, can include one or more glass components that can serve as a portion of the housing.

The housing assembly process 600 can obtain 602 a glass article that is to be utilized as part of the housing for an electronic device. The glass article can serve as an outer surface for a portion of the housing. For example, the glass article can be referred to as a cover glass and serve as a front glass cover for the housing. The thickness and size of the glass article varies with application. In one embodiment, the glass article has a thickness less than or equal to 5 (five) mm. In another embodiment, the glass article has a thickness less than or equal to 3 (three) mm. In another embodiment, the glass article has a thickness less than or equal to 1 (one) mm. Also, it should be recognized that the glass article can be pre-processed to chemically strengthen the glass article.

After the glass article has been obtained 602, the glass article can be processed to improve its strength. In this regard, an amorphous carbon coating can be deposited 604 on a portion of the surface of the glass article. The amorphous carbon coating is a thin coating (e.g., thin film) that can be applied to one or more surfaces of the glass article. The amorphous carbon is a hard coating that can be said to have diamond like properties. The amorphous carbon coating is not transparent (or substantially not transparent) and, thus, does impede the ability to use the glass article as a transparent cover glass for the housing. However, the amorphous carbon coating can be selectively deposited 604 to those portions of the surface of the glass article that are able to opaque. For example, a peripheral portion of the glass article might be coated with amorphous carbon, while a central portion might not be coating with amorphous carbon so that it remain transparent and thus suitable for use as a user interfacing surface. In one embodiment, the amorphous carbon coating can be deposited 604 using a plasma-assisted Physical Vapor Deposition (PVD) process. In one implementation, a masking operation can facilitate selectively depositing 604 of the amorphous carbon coating to certain portions of the glass article.

By providing the glass article with the amorphous carbon coating, the resulting glass article is more durable and/or stronger. In areas where the glass article has the amorphous carbon coating, the resulting glass article is significantly more resistant to breakage due to impact forces, such as sharp, blunt or edge impacts.

After the amorphous carbon coating has been deposited 604, an outer coating can be applied 606 over at least a portion of the amorphous carbon coating. While the amorphous carbon can substantially improve the strength of the glass article, the amorphous carbon coating may not provide desired characteristics for use as a user interfacing surface. Hence, the outer coating applied 606 over the amorphous carbon coating can serve to provide a protective barrier that is substantially smudge resistant such that the processed glass article can be utilized as a user interfacing surface. The outer coating is also transparent (or substantially transparent) so that is does not impede the ability to use the glass article as a cover glass for the housing. In one embodiment, the outer coating can be an oleophobic coating. In another embodiment, the outer coating can be formed of another material, such as at least one of $SiO_2$ and SiN. In general, the outer coating is thin and applied through deposition or spray techniques. In one embodiment, the outer coating has a thickness less than or equal to 0.1 mm.

Thereafter, the processed glass article with the amorphous carbon coating and the outer coating can be installed 608 on or within the housing for the electronic device. As previously noted, with selectively depositing the amorphous carbon, the processed glass article can remain suitable for use as a user interfacing surface of the housing. For example, the processed glass article can be used as a cover glass for a front face of a portable electronic device housing. Typically, to preserve transparency and suitably for a user interfacing surface, the central portion of the cover glass would not include an amorphous carbon coating. In such an embodiment, the peripheral portion is strengthened by an amorphous carbon coating, but the central portion is not coated with amorphous carbon and thus remains transparent. Although the processed glass article with its coatings can be suited for use as a user interfacing surface, the processed glass article need not be exposed to user interactions but instead can be provided internal to the housing. After the glass article has been installed 608, the housing assembly process 600 can end.

Figure 7A:
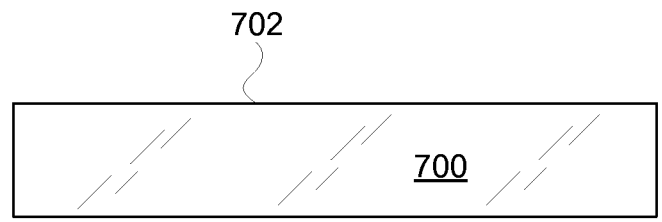
FIGS. 7A-7C illustrate processing of coating a glass article that forms a portion of an electronic device housing.
Figure 7B:
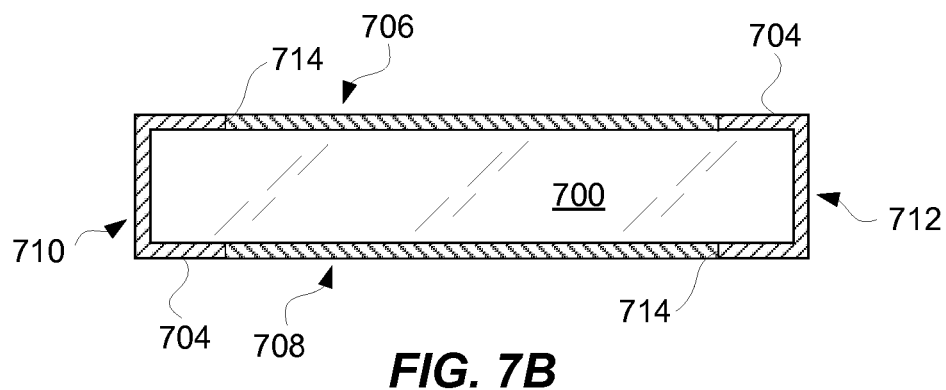
Figure 7C:
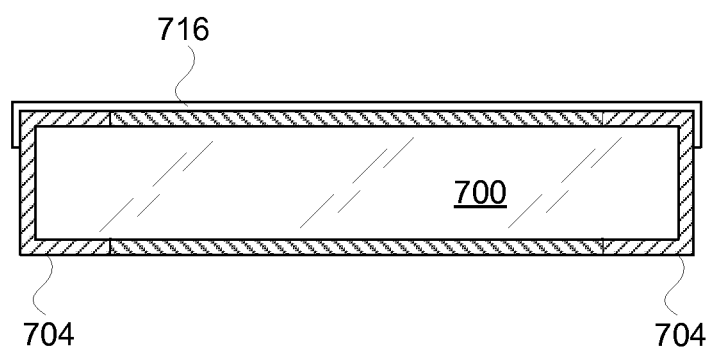

FIGS. 7A-7C illustrate processing of coating a glass article that forms a portion of an electronic device housing. In one embodiment, the processing depicted in FIGS. 7A-7C can perform the housing assembly process 600 illustrated in FIG. 6.

FIG. 7A illustrates a glass article 700 according to one embodiment. The glass article 700 is typically a thin sheet of glass. In one implementation, the glass for the glass article 700 can, for example, be alumina silicate glass or soda lime glass. Typically, the glass article 700 will have a thickness of less than 3 mm and in many cases less than 1 mm. The glass article 700 has an outer exposed surface 702 that can be referred to as a user interfacing surface. The outer exposed surface 702 is thus an exposed surface of the electronic device housing that a user can interface with to interact with the associated electronic device. For example, when the glass article 700 is utilized as a cover glass for an electronic device housing, the user can touch the outer exposed surface 702 while providing touch inputs to the associated electronic device, or the user can view (through the glass article 700) visual outputs from a display device of the associated electronic device mounted behind the glass article 700.

FIG. 7B illustrates the glass article 700 illustrated in FIG. 7A after an amorphous carbon coating 704 has been applied. In the depicted embodiment, the amorphous carbon coating 704 is provided on a peripheral portion of the glass article 700. More particularly, the glass article 700 includes not only the exposed outer surface 702 which can pertain to a top surface 706, but also a bottom surface 708 and side surfaces 710, 712. However, when the glass article 700 is providing a user interfacing surface of the electronic device housing, a central portion 714 of the top surface 706 and the bottom surface 708 of the glass article 700 do not receive the amorphous carbon coating 704 and thus remain transparent. In one embodiment, the central portion includes all of the top surface 706 and the bottom surface 708 except the peripheral portion which extends inward from edge a distance (e.g., about 1-25 mm) depending on implementation. However, in other embodiment, any portion of the top surface 706 and the bottom surface 708 that need not be translucent can receive the amorphous carbon coating 704.

After in the amorphous carbon coating 704 is been applied to appropriate portions of the surfaces of the glass article 700, an outer coating 716 can be applied to at least the exposed outer surface 702 (or top surface 706) of the glass article 700. FIG. 7C illustrates the glass article 700 with the amorphous carbon coating 704 as well as with the outer coating 716 applied over some or all of the exposed outer surface 702. The outer coating 716 provides desired characteristics to the exposed outer surface 702 of the glass article 700. For example, the outer coating 716 can be an anti-smudge coating, such as an oleophobic coating. It should be understood that the outer coating 716 could also be applied to the bottom surface 708 and/or one or both of the side surfaces 710, 712.

Figure 7D:
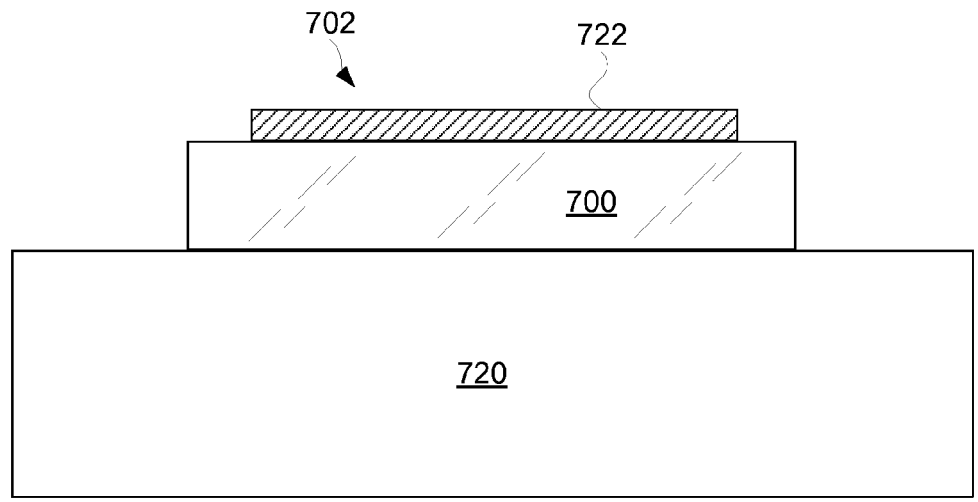
FIGS. 7D-7F illustrate processing of coating a glass article with an amorphous carbon coating.
Figure 7E:
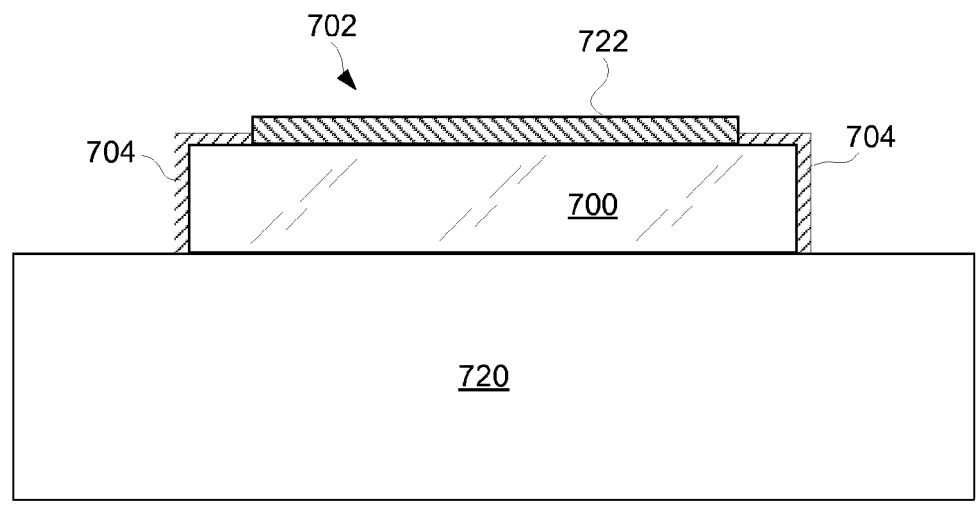
Figure 7F:
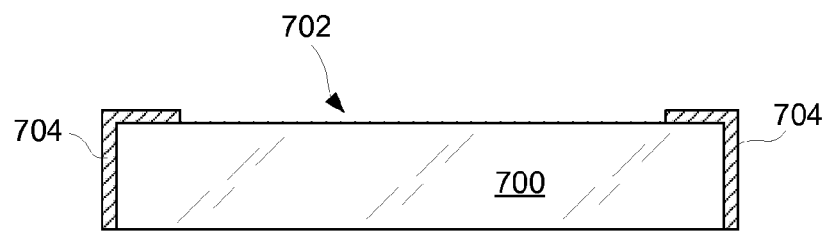

FIGS. 7D-7F illustrate processing of coating a glass article with an amorphous carbon coating. In one embodiment, the processing depicted in FIGS. 7D-7F can perform the application of the amorphous carbon coating 704 to a portion of the glass article 700 in FIG. 7B. Specifically, FIG. 7D illustrates the glass article 700 resting on a metal substrate 720. In addition, the central portion 714 of the exposed outer surface 702 can be covered by a mask 722. The mask 722 serves to cover the central portion 714 so that no amorphous carbon coating is formed at the central portion 714. Since the central portion 714 is typically provided over a display device, it should not be coated with an amorphous carbon coating, since the amorphous carbon coating 704 is opaque (i.e., substantially non-transparent). The mask 722 can, for example, be aluminum or copper tape. FIG. 7E illustrates formation of the amorphous carbon coating 704 over the peripheral portion. The amorphous carbon coating 704 can be applied by plasma-assisted physical vapor deposition (PVD) at an elevated temperature of about 130 degrees Celsius. The metal substrate 720 serves to facilitate the bonding of the amorphous carbon to the peripheral portion of the glass article 700 so as to form the amorphous carbon coating 704. The metal substrate 720 can attract the amorphous carbon in the vicinity of the glass article 700, and since the metal substrate 720 is also near the peripheral portion of the glass article 700, the ability to form the amorphous carbon coating 704 on the peripheral portions of the glass article 700 is substantially enhanced. In another embodiment, the media substrate 720 could wrap around the sides of the glass article to provide additional metal near the peripheral region. FIG. 7F illustrates the glass article 700 after the amorphous carbon coating 704 has been formed, and after the glass article 700 has been removed from the media substrate 720. In FIG. 7F, the mask 722 has also been removed so as to expose the exposed outer surface 702.

According to another aspect, an electronic device housing can be provided with a glass article that uses a combination of coatings to achieve the desired characteristics. In one embodiment, the combination of coatings includes at least one soft coating and at least one hard coating. The soft coating facilitates impact protection, while the hard coating facilitates durability and strength. The coatings can be applied to selected portions of the glass article if desired.

Figure 8:
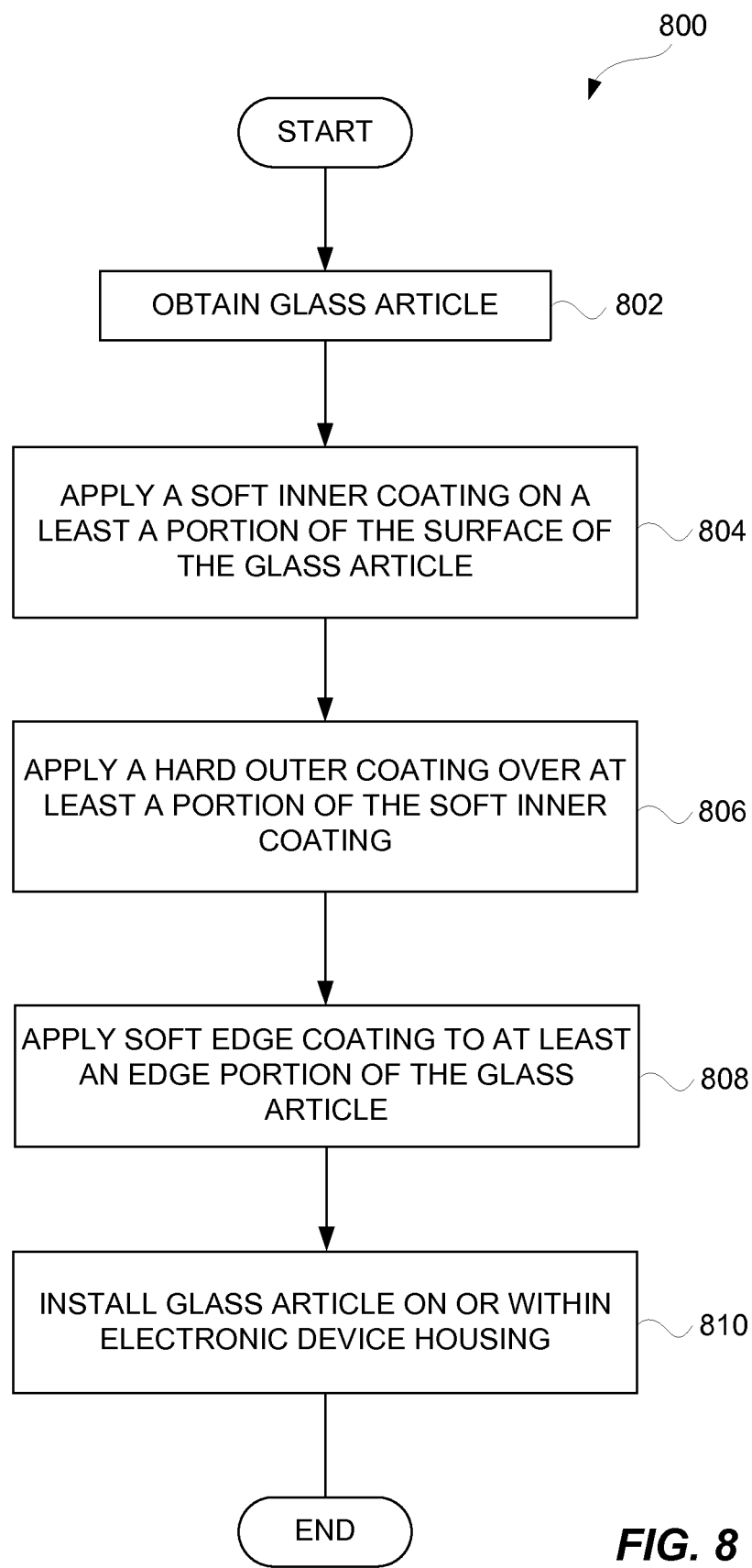
FIG. 8 is a flow diagram of a housing assembly process according to another embodiment.

FIG. 8 is a flow diagram of a housing assembly process 800 according to another embodiment. The housing being assembled can pertain to a housing for an electronic device, such as a portable electronic device. The housing can include one or more glass components that can serve as a portion of the housing.

The housing assembly process 800 can obtain 802 a glass article that is to be utilized as part of the housing for an electronic device. The glass article can serve as an outer surface for a portion of the housing. For example, the glass article can be referred to as a cover glass and serve as a front glass cover for the housing. The thickness and size of the glass article varies with application. In one embodiment, the glass article has a thickness less than or equal to 5 (five) mm. In another embodiment, the glass article has a thickness less than or equal to 3 (three) mm. In another embodiment, the glass article has a thickness less than or equal to 1 (one) mm. Also, it should be recognized that the glass article can be pre-processed to chemically strengthen the glass article.

After the glass article has been obtained 802, the glass article can be processed to improve its strength. In this regard, a soft inner coating can be applied 804 on at least a portion of the surface of the glass article. The soft inner coating, if transparent (or substantially transparent), can be applied over a user interfacing surface without impeding the ability to use the glass article as a cover glass for the housing. Alternatively, if not transparent (or substantially not transparent), the soft inner coating can be applied at peripheral portions so that central portions can remain transparent and suitable for user interfacing surfaces. The soft inner coating is a very thin coating that can be applied to one or more surfaces of the glass article. By providing the glass article with the soft inner coating, the resulting glass article is more resistant to breakage due to impact forces, such as sharp, blunt or edge impacts. The soft inner coating can, for example, be formed of at least one of epoxy, silicone, copper, or various polymers. The thickness of the soft inner coating can vary with application. In one embodiment, the thickness of the soft inner coating is 5-150 micrometers.

After the soft inner coating has been applied 804, a hard outer coating can be applied 806 over at least a portion of the soft inner coating. While the soft inner coating can substantially improve the ability of the glass article to endure impact events, the soft inner coating may not be sufficiently durable or otherwise suitable for use as a user interfacing surface. Hence, the hard outer coating applied 806 over the soft inner coating can serve to provide a protective barrier that is durable (e.g., substantially scratch resistant) such that the processed glass article can be utilized as a user interfacing surface. The hard outer coating can also transparent (or substantially transparent) so that is does not impede the ability to use the glass article as a cover glass for the housing. Alternatively, if the hard outer coating is not transparent (or substantially not transparent), the hard outer coating can be applied at peripheral portions so that central portions can remain transparent and suitable for user interfacing surfaces.

In one embodiment, the hard outer coating can be formed of at least one of $SiO_2$, SiNi, SiN. Ni+3Cr, Ni+white bronze, or Ni+3Cr+white bronze. White bronze is a metal alloy including amounts of copper, tin and zinc. In another embodiment, the hard outer coating can be an oleophobic coating. In one implementation, the hard outer coating could be an amorphous carbon coating. The amorphous carbon coating can be a coating of amorphous carbon with diamond like properties. In general, the hard outer coating is thin and applied through deposition, spray or dipping techniques. In one embodiment, the outer coating has a thickness less than or equal to 100 micrometers.

The housing assembly process 800 can also optionally apply 808 a soft edge coating to at least an edge portion of the glass article. The edge portion that receives the soft edge coating that is applied 808 to the glass article. The soft edge coating can be formed by a soft material, such as epoxy, silicone or various polymers, to the edge portion. In one embodiment, the thickness of the soft edge coating can be about 25-250 micrometers (e.g., 200 micrometers). The soft edge coating at the edge portion can serve to further protect the edge portion from impact events, such as due to a user dropping the housing for the electronic device. The soft edge coating can be applied 808 to the edge portion by injection molding, spraying, deposition, or other techniques.

Thereafter, the processed glass article with the soft inner coating, the hard outer coating and optionally the soft edge coating can be installed 810 on or within the housing for the electronic device. As previously noted, the processed glass article is suitable for use as a user interfacing surface of the housing. For example, the processed glass article can be used as a cover glass for a front face of a portable electronic device housing. Although the processed glass article with its coatings is well suited for use as a user interfacing surface, the processed glass article need not be exposed to user interactions but instead can be provided internal to the housing. After the glass article has been installed 810, the housing assembly process 800 can end.

In an alternative embodiment, the hard outer coating can be applied on at least a portion of the surface of the glass article. That is, the hard outer coating can, in general, be deposition directly onto the surface of the glass article without any intermediate layers in between or there can be one or more layers between the hard outer coating and the surface of the glass. Different portions of the glass article can have one or more different layers of coatings applied thereto. In another alternative embodiment, a portion of the surface of the glass article has a soft coating (e.g., soft inner coating) applied thereto without any hard outer coating applied. This alternative embodiment can optionally also include a soft edge coating provided on at least an edge portion of the glass article.

Figure 9A:
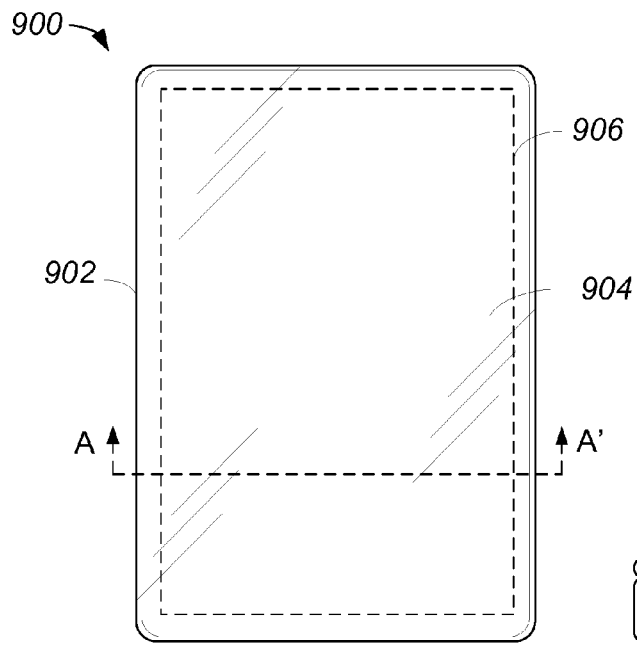
FIGS. 9A and 9B are diagrammatic representations of electronic device according to one embodiment.
Figure 9B:
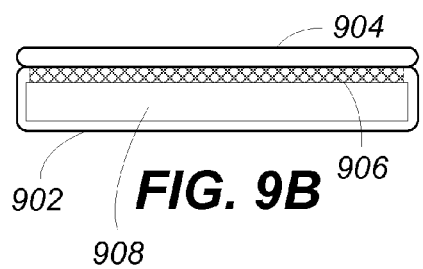

FIGS. 9A and 9B are diagrammatic representations of electronic device 900 according to one embodiment. FIG. 9A illustrates a top view for the electronic device 900, and FIG. 9B illustrates a cross-sectional side view for electronic device 900 with respect to reference line A-A'. Electronic device 900 can include housing 902 that has glass cover window 904 (glass cover) as a top surface. Cover window 904 is primarily transparent so that display assembly 906 is visible through cover window 904. Cover window 904 can be coated as in any of the various embodiments, or combinations thereof, discussed above to improve its characteristics. The coatings applied to the cover window 904, however, should not significantly impede the visibility of the display assembly 906 through the cover window 904. Display assembly 906 can, for example, be positioned adjacent cover window 904. Housing 902 can also contain internal electrical components besides the display assembly, such as a controller (processor), memory, communications circuitry, etc. Display assembly 906 can, for example, include a LCD module. By way of example, display assembly 906 may include a Liquid Crystal Display (LCD) that includes a Liquid Crystal Module (LCM). In one embodiment, cover window 904 can be integrally formed with the LCM. Housing 902 can also include an opening 908 for containing the internal electrical components to provide electronic device 900 with electronic capabilities. In one embodiment, housing 902 may need not include a bezel for cover window 904. Instead, cover window 904 can extend across the top surface of housing 902 such that the edges of cover window 904 can be aligned (or substantially aligned) with the sides of housing 902. The edges of cover window 904 can remain exposed. Although the edges of cover window 904 can be exposed as shown in FIGS. 9A and 9B, in alternative embodiment, the edges can be further protected. As one example, the edges of cover window 904 can be recessed (horizontally or vertically) from the outer sides of housing 902. As another example, the edges of cover window 904 can be protected by additional material placed around or adjacent the edges of cover window 904.

Cover window 904 may generally be arranged or embodied in a variety of ways. By way of example, cover window 904 may be configured as a protective glass piece that is positioned over an underlying display (e.g., display assembly 906) such as a flat panel display (e.g., LCD) or touch screen display (e.g., LCD and a touch layer). Alternatively, cover window 904 may effectively be integrated with a display, i.e., glass window may be formed as at least a portion of a display.

Additionally, cover window 904 may be substantially integrated with a touch sensing device such as a touch layer associated with a touch screen. In some cases, cover window 904 can serve as the outer most layer of the display.

Figure 10A:
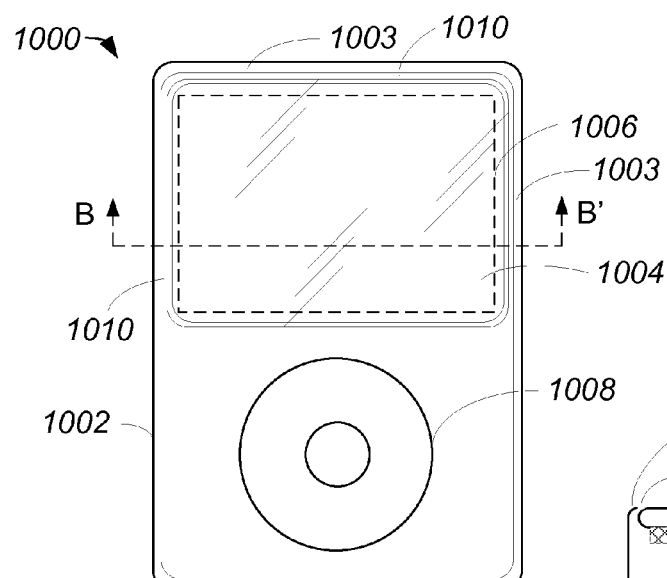
FIGS. 10A and 10B are diagrammatic representations of electronic device according to another embodiment of the invention.
Figure 10B:
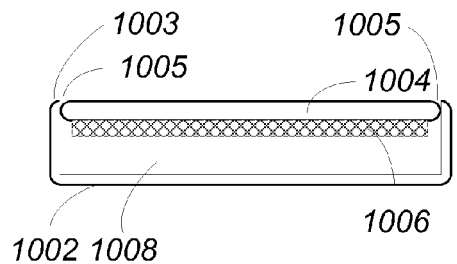

FIGS. 10A and 10B are diagrammatic representations of electronic device 1000 according to another embodiment of the invention. FIG. 10A illustrates a top view for electronic device 1000, and FIG. 10B illustrates a cross-sectional side view for electronic device 1000 with respect to reference line B-B'. Electronic device 1000 can include housing 1002 that has glass cover window 1004 (glass cover) as a top surface. Cover window 1004 can be coated as in any of the various embodiments, or combinations thereof, discussed above to improve its characteristics. The coatings applied to the cover window 1004, however, should not significantly impede the visibility of the display assembly 1006 through the cover window 1004.

In this embodiment, cover window 1004 can be protected by side surfaces 1003 of housing 1002. Here, cover window 1004 does not fully extend across the top surface of housing 1002; however, the top surface of side surfaces 1003 can be adjacent to and aligned vertically with the outer surface of cover window 1004. Since the edges of cover window 1004 can be rounded for enhanced strength, there may be gaps 1005 that are present between side surfaces 1003 and the peripheral edges of cover window 1004. Gaps 1005 are typically very small given that the thickness of cover window 1004 is thin (e.g., less than 3 mm). However, if desired, gaps 1005 can be filled by a material. The material can be plastic, rubber, metal, etc. The material can conform in gap 1005 to render the entire front surface of electronic device 1000 flush, even across gaps 1005 proximate the peripheral edges of cover window 1004. The material filling gaps 1005 can be compliant. The material placed in gaps 1005 can implement a gasket. By filling the gaps 1005, otherwise probably undesired gaps in the housing 1002 can be filled or sealed to prevent contamination (e.g., dirt, water) forming in the gaps 1005. Although side surfaces 1003 can be integral with housing 1002, side surface 1003 could alternatively be separate from housing 1002 and, for example, operate as a bezel for cover window 1004.

Cover window 1004 is primarily transparent so that display assembly 1006 is visible through cover window 1004. Display assembly 1006 can, for example, be positioned adjacent cover window 1004. Housing 1002 can also contain internal electrical components besides the display assembly, such as a controller (processor), memory, communications circuitry, etc. Display assembly 1006 can, for example, include a LCD module. By way of example, display assembly 1006 may include a Liquid Crystal Display (LCD) that includes a Liquid Crystal Module (LCM). In one embodiment, cover window 1004 is integrally formed with the LCM. Housing 1002 can also include an opening 1008 for containing the internal electrical components to provide electronic device 1000 with electronic capabilities.

The front surface 1010 of electronic device 1000 can also include user interface control 1008 (e.g., wheel control via buttons or touch sensitive surface(s)). In this embodiment, cover window 1004 does not cover the entire front surface of electronic device 1000. Electronic device 1000 essentially includes a partial display area that covers a portion of the front surface 1010.

Cover window 1004 may generally be arranged or embodied in a variety of ways. By way of example, cover window 1004 may be configured as a protective glass piece that is positioned over an underlying display (e.g., display assembly 1006) such as a flat panel display (e.g., LCD) or touch screen display (e.g., LCD and a touch layer). Alternatively, cover window 1004 may effectively be integrated with a display, i.e., glass window may be formed as at least a portion of a display. Additionally, cover window 1004 may be substantially integrated with a touch sensing device such as a touch layer associated with a touch screen. In some cases, cover window 1004 can serve as the outer most layer of the display.

As noted above, the electronic device can be a handheld electronic device or a portable electronic device. The embodiments discussed herein can serve to enable a glass cover for an electronic device housing to be not only thin but also adequately strong. Since handheld electronic devices and portable electronic devices are mobile, they are potentially subjected to various different impact events and stresses that stationary devices are not subjected to. As such, embodiments discussed herein are well suited for implementation of glass surfaces for handheld electronic device or a portable electronic device that are designed to be thin.

The embodiments discussed herein are particularly useful for thin glass applications. For example, the thickness of a glass cover being strengthened can be between about 0.5-2.5 mm. In other embodiments, the strengthening is suitable for glass products whose thickness is less than about 2 mm, or even thinner than about 1 mm, or still even thinner than about 0.6 mm.

In one embodiment, the size of the glass cover depends on the size of the associated electronic device. For example, with handheld electronic devices, the size of the glass cover is often not more than five (5) inches (about 12.7 cm) diagonal. As another example, for portable electronic devices, such as smaller portable computers or tablet computers, the size of the glass cover is often between four (4) (about 10.2 cm) to twelve (12) inches (about 30.5 cm) diagonal. As still another example, for portable electronic devices, such as full size portable computers, displays (including televisions) or monitors, the size of the glass cover is often between ten (10) (about 25.4 cm) to twenty (20) inches (about 50.8 cm) diagonal or even larger.

However, it should be appreciated that with larger screen sizes, the thickness of the glass layers may need to be greater. The thickness of the glass layers may need to be increased to maintain planarity of the larger glass layers. While the displays can still remain relatively thin, the minimum thickness can increase with increasing screen size. For example, the minimum thickness of the glass cover can correspond to about 0.3 mm for small handheld electronic devices, about 0.5 mm for smaller portable computers or tablet computers, about 1.0 mm or more for full size portable computers, displays or monitors, again depending on the size of the screen. However, more generally, the thickness of the glass cover can depend on the application and/or the size of electronic device.

The techniques describe herein may be applied to glass surfaces used by any of a variety of electronic devices including but not limited handheld electronic devices, portable electronic devices and substantially stationary electronic devices. Examples of these include any known consumer electronic device that includes a display. By way of example, and not by way of limitation, the electronic device may correspond to media players, mobile phones (e.g., cellular phones), PDAs, remote controls, notebooks, tablet PCs, monitors, all in one computers and the like.

The various aspects, features, embodiments or implementations of the invention described above can be used alone or in various combinations.

Although only a few embodiments of the invention have been described, it should be understood that the invention may be embodied in many other specific forms without departing from the spirit or the scope of the present invention. By way of example, the steps associated with the methods of the invention may vary widely. Steps may be added, removed, altered, combined, and reordered without departing from the spirit of the scope of the invention. Similarly, while operations are depicted in the drawings in a particular order, this should not be understood as requiring that such operations be performed in the particular order shown or in sequential order, or that all illustrated operations be performed, to achieve desirable results.

While this specification contains many specifics, these should not be construed as limitations on the scope of the disclosure or of what may be claimed, but rather as descriptions of features specific to particular embodiment of the disclosure. Certain features that are described in the context of separate embodiments can also be implemented in combination. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An electronic device, comprising:
a housing, the housing including a glass member providing a user facing outer surface for a portion of the housing, wherein a portion of the glass member is provided over a display device that is provided within the housing, and wherein another portion of the glass member is provided with an amorphous carbon coating, the portion of the glass member that is provided with the amorphous carbon coating does not include the portion of the glass member provided over the display device provided within the housing.

2. An electronic device as recited in claim 1, wherein the amorphous carbon coating is applied by a plasma-assisted physical vapor deposition process.

3. An electronic device as recited in claim 1, wherein the amorphous carbon coating comprises a coating of amorphous carbon with diamond like properties.

4. An electronic device as recited in claim 1, wherein the glass member further includes an edge, and wherein at least a portion of the edge is provided with a soft coating.

5. An electronic device as recited in claim 1, wherein the amorphous carbon coating is a first coating, and wherein at least the portion of the glass member or a sub-portion thereof is coated with a second coating, the second coating being substantially transparent protective coating.

6. An electronic device as recited in claim 5, wherein the second coating comprises at least one of $SiO_2$ and SiN.

7. An electronic device as recited in claim 5, wherein the second coating comprises an oleophobic coating.

8. An electronic device as recited in claim 5, wherein the second coating comprises a substantially scratch resistant coating.

9. An electronic device as recited in claim 5, wherein the second coating is provided on at least the portion of the glass member provided over the display device.

10. An electronic device as recited in claim 1, wherein the glass member is chemically strengthened before the amorphous carbon coating is applied to the glass member.

11. An electronic device as recited in claim 10, wherein the amorphous carbon coating has a thickness less than or equal to 0.1 mm.

12. An electronic device as recited in claim 1,
wherein the amorphous carbon coating is a first coating, and
wherein at least the portion of the glass member or a sub-portion thereof is coated with a second coating, the second coating being substantially transparent protective coating.

13. An electronic device as recited in claim 12, wherein the substantially transparent protective coating comprises at least one of $SiO_2$ and SiN.

14. An electronic device as recited in claim 12, wherein the substantially transparent protective coating comprises an oleophobic coating.

15. An electronic device as recited in claim 12, wherein the substantially transparent protective coating comprises a substantially scratch resistant coating.

16. A portable electronic device, comprising:
a housing, the housing including a glass article providing a user facing outer surface for a portion of the housing;
a display device coupled to the housing,
wherein a portion of the glass article is provided as or over the display device that is coupled to the housing, and
wherein another portion of the glass article is provided with an amorphous carbon coating, the portion of the glass article that is provided with the amorphous carbon coating does not include the portion of the glass article provided as or over the display device.

17. A portable electronic device as recited in claim 16, wherein the amorphous carbon coating has a thickness less than or equal to 0.1 mm.

18. A portable electronic device as recited in claim 16, wherein the amorphous carbon coating is applied by a plasma-assisted physical vapor deposition process.

19. A portable electronic device as recited in claim 16, wherein the amorphous carbon coating comprises a coating of amorphous carbon with diamond like properties.

20. A portable electronic device as recited in claim 16, wherein the glass article further includes an edge, and wherein at least a portion of the edge is provided with a soft coating.

21. A portable electronic device as recited in claim 16,
wherein the amorphous carbon coating is a first coating, and
wherein at least the portion of the glass article or a sub-portion thereof is coated with a second coating, the second coating being substantially transparent protective coating.

22. A portable electronic device as recited in claim 21, wherein the substantially transparent protective coating is provided on at least the portion of the glass article that is provided as or over the display device.

23. A portable electronic device as recited in claim 21, wherein the substantially transparent protective coating comprises a substantially scratch resistant coating.

24. A portable electronic device as recited in claim 21, wherein the substantially transparent protective coating comprises an oleophobic coating.

25. A portable electronic device as recited in claim 16, wherein the glass article is chemically strengthened before the amorphous carbon coating is applied to the glass article.

* * * * *